United States Patent [19]

Takimoto

[11] Patent Number: 5,448,964
[45] Date of Patent: Sep. 12, 1995

[54] NET CAGE

[75] Inventor: Yasuhiro Takimoto, Osaka, Japan

[73] Assignee: Kujaku Kana-Ami Co., Ltd., Osaka, Japan

[21] Appl. No.: 195,466

[22] Filed: Feb. 14, 1994

[30] Foreign Application Priority Data

Feb. 12, 1993 [JP] Japan .................. 5-009606 U

[51] Int. Cl.⁶ .............................................. A01K 31/08
[52] U.S. Cl. ................................................... 119/17
[58] Field of Search ....................... 119/17, 15, 19, 21, 119/23

[56] References Cited

U.S. PATENT DOCUMENTS

| 2,864,335 | 12/1958 | Yellin | 119/23 |
| 3,683,857 | 8/1972 | Yellin | 119/17 |
| 4,593,650 | 6/1986 | Lattuada | 119/17 X |
| 4,736,709 | 4/1988 | Migler | 119/15 X |
| 4,909,188 | 3/1990 | Tominaga | 119/15 X |
| 5,000,121 | 3/1991 | Daily | 119/17 |
| 5,010,848 | 9/1991 | Rankin | 119/17 X |

Primary Examiner—Gene Mancene
Assistant Examiner—Thomas Price
Attorney, Agent, or Firm—Wenderoth, Lind & Ponack

[57] ABSTRACT

A net cage has a net cage body separable from a receiving seat to easily conduct washing of the receiving seat, disposal of a sheet laid on the receiving seat. A surrounding net portion, a ceiling net portion, a bottom net portion and the receiving seat for receiving the net cage body constructed from the above described three portions through upper and lower frames thereon form the net cage. The surrounding net portion is adapted to be divided into two parts, that is, a right part and a left part. The upper and lower frames have the same shape and are provided with first engaging pieces for holding upper and lower edge portions of the divided net portions from inside tire frames and second engaging pieces for slidably receiving and holding an edge portion of the ceiling net portion and the bottom net portion in the horizontal direction, respectively.

13 Claims, 4 Drawing Sheets

NET CAGE

BACKGROUND OF THE INVENTION

1. Field of the Invention

The present invention relates to an improvement for a net cage used for breeding small animals such as little birds and squirrels.

2. Description of the Prior Art

A conventional net cage has, in general, the following construction.

Reference is made to, for example, a rectangular net cage as seen in a plan view in FIG. 5. A surrounding net portion 22 is provided with a door 21 for opening and closing a gateway, and is adapted to be folded in four (or divided into two parts, that is a right part and a left part, each of which can be folded). A ceiling net portion 23 is connected with an upper opening of the surrounding net portion 22 through a hinge 24 connected with the ceiling net portion 23 and engages an idle end side of the ceiling net portion 23 with an engaging member 25, also connected with the surrounding net portion 22. A box-shaped net cage body 26 is thereby constructed, opening on a lower side. An engaging hole 30 is formed in a rising plate portion 29 of a receiving box 28 that is provided with a drawer 27. An engaging portion 31 is formed by bending a part of the surrounding net portion 22 and is engaged with the engaging hole 30 of the receiving box 28 by bending the engaging portion 31 to provide a construction where the receiving box 28 can be removed and the net cage body 26 can be folded as desired.

However, not only are the construction for pivoting the ceiling net portions 23 on the edge portion on one side of the surrounding net portion 22, and the construction for engagedly connecting the idle end side of the ceiling net portion 23 and the receiving box 28 with the surrounding net portion 22 at an upper portion and a lower portion, respectively, of the surrounding net portion 22 are specialized and expensive, but the operation of pushing a plurality of the engaging portions 31 in turn with a finger so that the net cage body 26 is lifted up to remove the engaging portions 31 from the engaging holes 30 must be repeated in turn in order to remove the receiving box 28 from the net cage body 26. Additionally, the engaging portions 31, which have been removed, are frequently engaged with the engaging hole 30 again, using time and labor for removing the receiving box 28.

In addition, there has been the possibility that the final removal of the net cage body 26 from the receiving box 28 is apt to be accompanied by a shock, thereby surprising the small animals which are being bred, or spilling food and water from a food box and a water container provided on the net cage body 26. And the net cage body 26 is opened on the lower side thereof, so that the small animals escape unless the removal of the net cage body 26 is carefully conducted.

Besides, it is indispensable when the small animals are looked after that a sheet, such as newsprint, laid in the drawer 27 of the receiving box 28 is frequently exchanged to dispose remaining food, dung and the like, thereby making the inside of the net cage clean. But not only is the sheet apt to be hung over the gateway of the drawer 27 when the drawer 27 is drawn out, and it is difficult to dispose of the remaining food and the like spilled in the receiving box 28, but time is also taken for closing a gateway so that the small animals cannot escape.

SUMMARY OF THE INVENTION

The present invention has been achieved in view of the above problems in the prior art, and it is an object of the present invention to provide a net cage having a shape quite different from that of the conventional net cage and capable of preventing the above described disadvantages from occurring.

In order to achieve the above described object, a net cage according to the present invention comprises a surrounding net portion provided with a door for opening and closing a gateway, a ceiling net portion connected with an edge portion of an upper opening of the surrounding net portion through an upper frame, a bottom net portion connected with an edge portion of a lower opening of the surrounding net portion through a lower frame and a receiving seat for placing a net cage body constructed from the three portions through the upper and lower frames thereon. The surrounding net portion is adapted to be divided into at least tow parts, that is, a right part and a left part, and the upper frame and the lower frame are provided with a first engaging piece for engaging upper and lower edge portions of the divided net portions from inside the frames and a second engaging piece for slidably engaging an edge portion of the ceiling net portion or the bottom net portion in the horizontal direction, respectively.

According to the above described construction, the net cage body, the inside of which is empty, can be constructed by engaging the upper and lower edge portions of the divided net portions formed by dividing the surrounding net portion into at least two parts with the first engaging pieces of the upper and lower frames and slidably engaging the ceiling net portion and the bottom net portion with the second engaging piece of the upper and lower frames.

The net cage can then be obtained by merely placing the net cage body on the receiving seat.

DETAILED DESCRIPTION OF THE PREFERRED EMBODIMENTS

Figure 1:
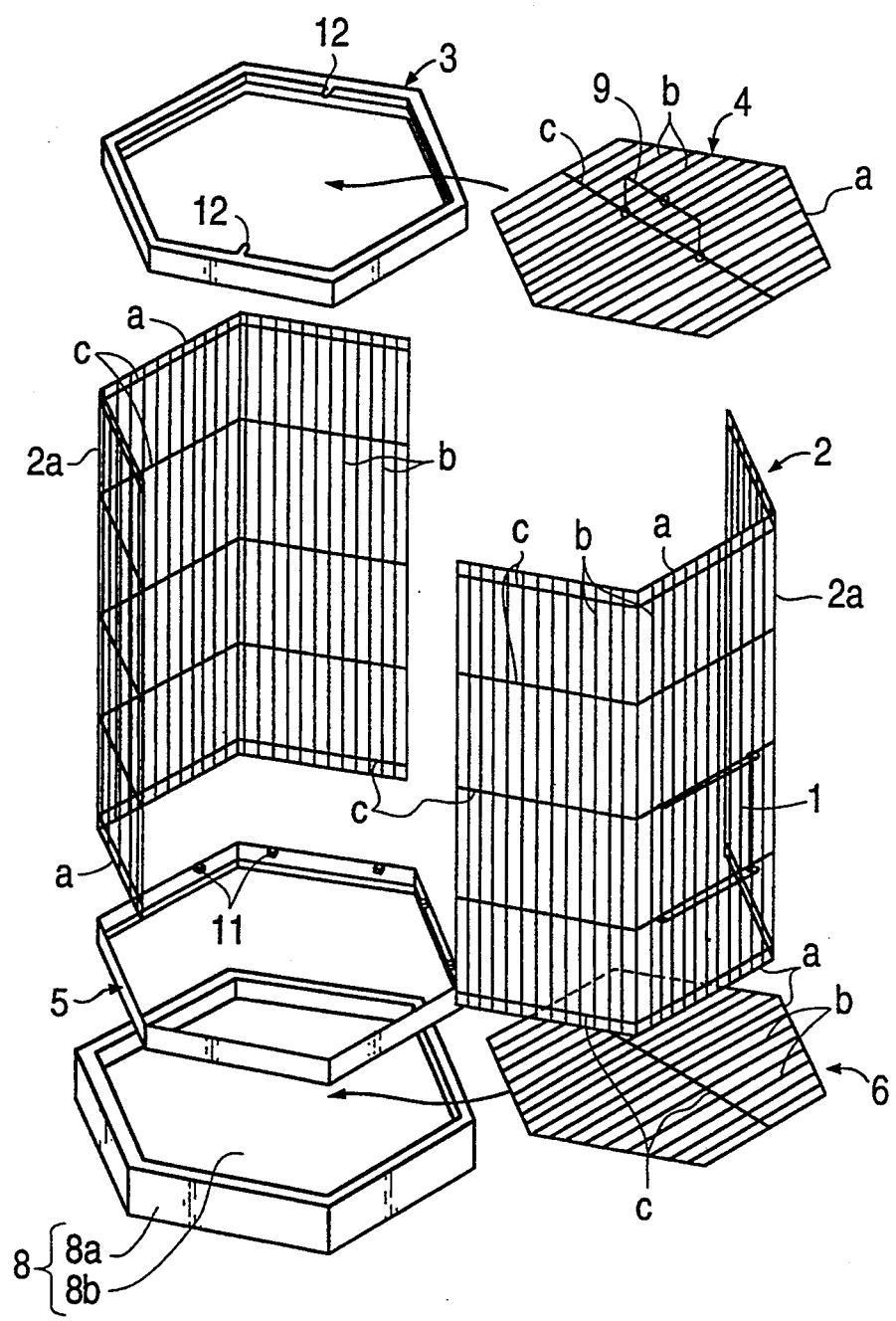
FIG. 1 is an exploded perspective view showing a net cage according to the present invention.
Figure 2:
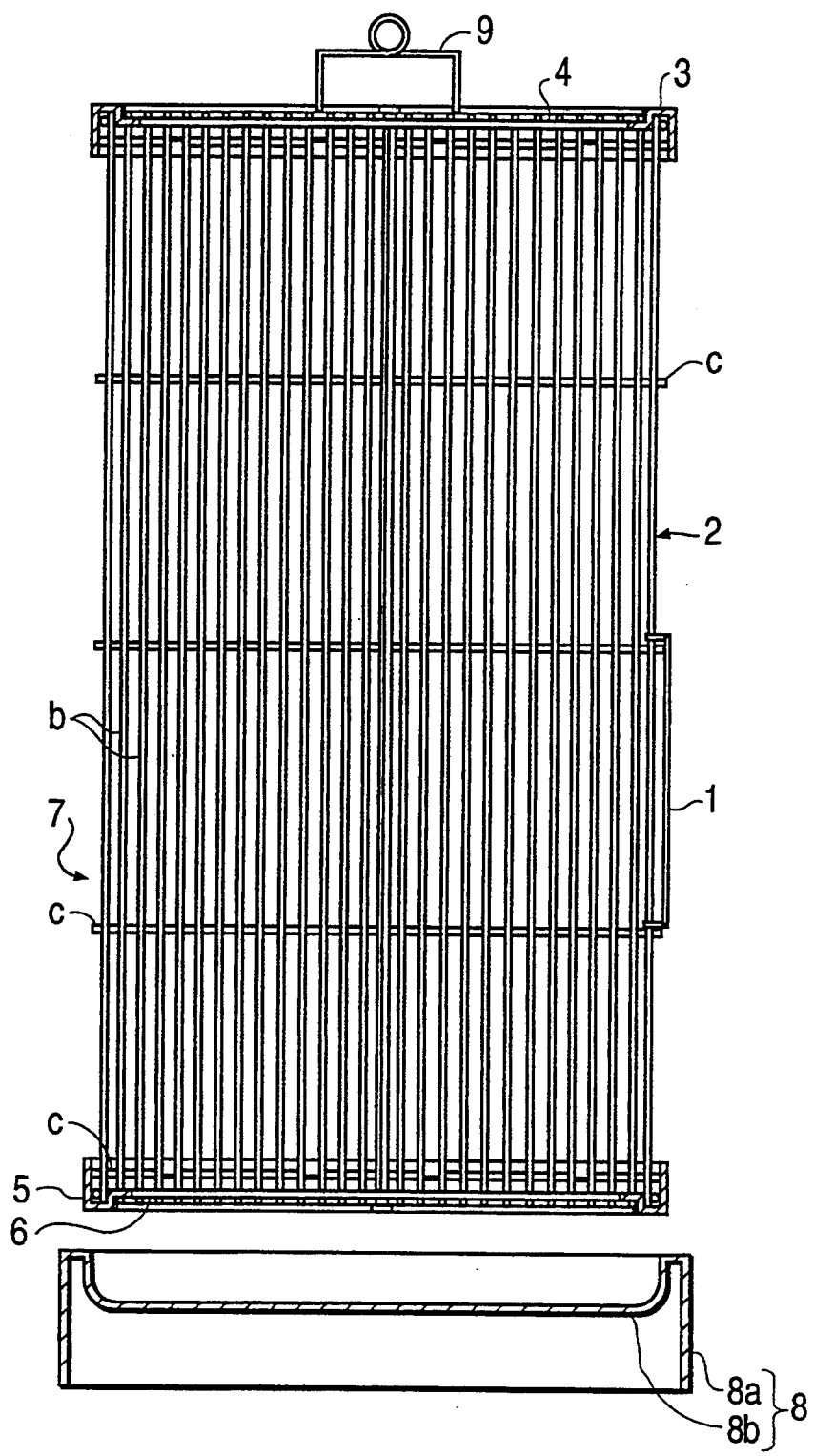
FIG. 2 is a side view showing the net cage of FIG. 1.

The preferred embodiments of the present invention will be described below with reference to the drawings. FIGS. 1 and 2 show a net cage according to one preferred embodiment of the present invention.

This net cage comprises a surrounding net portion 2 provided with a net door 1 for opening and closing a gateway and having a hexagonal shape as seen in a plan view. A ceiling net portion 4 is connected with an edge portion of an upper opening of the surrounding net portion 2 through an upper frame 3. A bottom net portion 6 is connected with an edge portion of a lower opening of the surrounding net portion 2 through a lower frame 5, and a receiving seat 8 receives an assembled net cage body 7 (FIG. 2) constructed from the three portions 2, 4 and 6 and the upper and lower frames 3 and 5 thereon.

The surrounding net portion 2 is divided into two parts, that is, a right part and a left part, under the condition that each of two divided net portions 2a has three side of the surrounding net part 2, respectively, and the divided net portions 2a, the ceiling net portion 4 and the bottom net portion 6 are provided with net wire materials (b) arranged with appointed intervals so that the net wire materials (b) have reinforcing wire materials (a) therearound and intermediate reinforcing wire materials (c) so as to connect the net wire materials (b) with each other.

One divided net portion 2a is provided with the net door 1, and a handle 9 for carrying the net cage is mounted on the intermediate reinforcing wire material (c) of the ceiling net portion 4.

Figure 3:
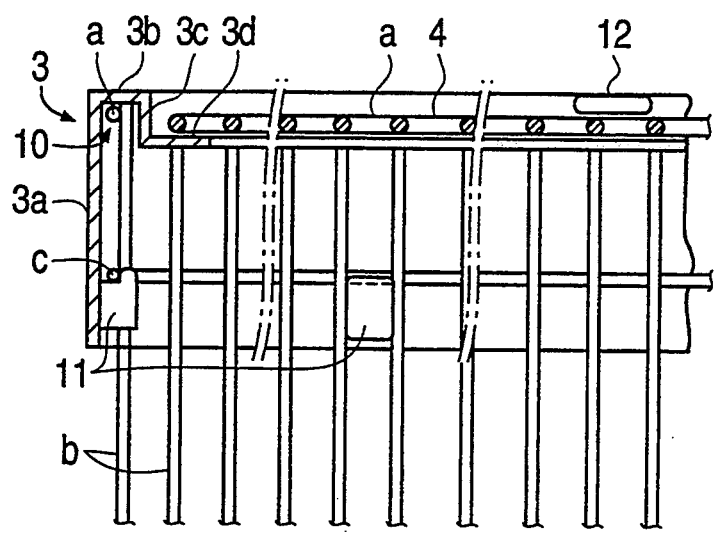
FIG. 3 is a sectional view showing a portion through which a surrounding net portion is connected with an upper frame.

As is clear from FIGS. 1 and 2, the upper and lower frames 3 and 5 are formed in the same shape and molded from, for example, synthetic resins. More detail is shown in FIG. 3, showing a sectional shape of one side of a hexagon. The upper frame 3 comprises a vertical plate portion 3a positioned on an outer circumferential portion of an upper edge of the divided net portion 2a, and upper plate portion 3b bent inward from an upper end of the vertical plate portion 3a, a descending plate portion 3c bent downward from an inner end of said upper plate portion 3b and a reinforcing plate portion 3d directed inward from a lower end of the descending plate portion 3c. A groove 10, with which the reinforcing wire material (a) of the upper edge of the divided net portion 2a is to be engaged, is constructed from the above described three members, that is, the vertical plate portion 3a, the upper plate portion 3b and the descending portion 3c.

Figure 4:
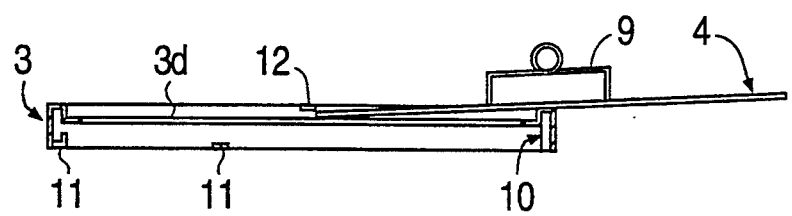
FIG. 4 is a diagram showing slidable engagement of a ceiling net portion with the upper frame.
Figure 5:
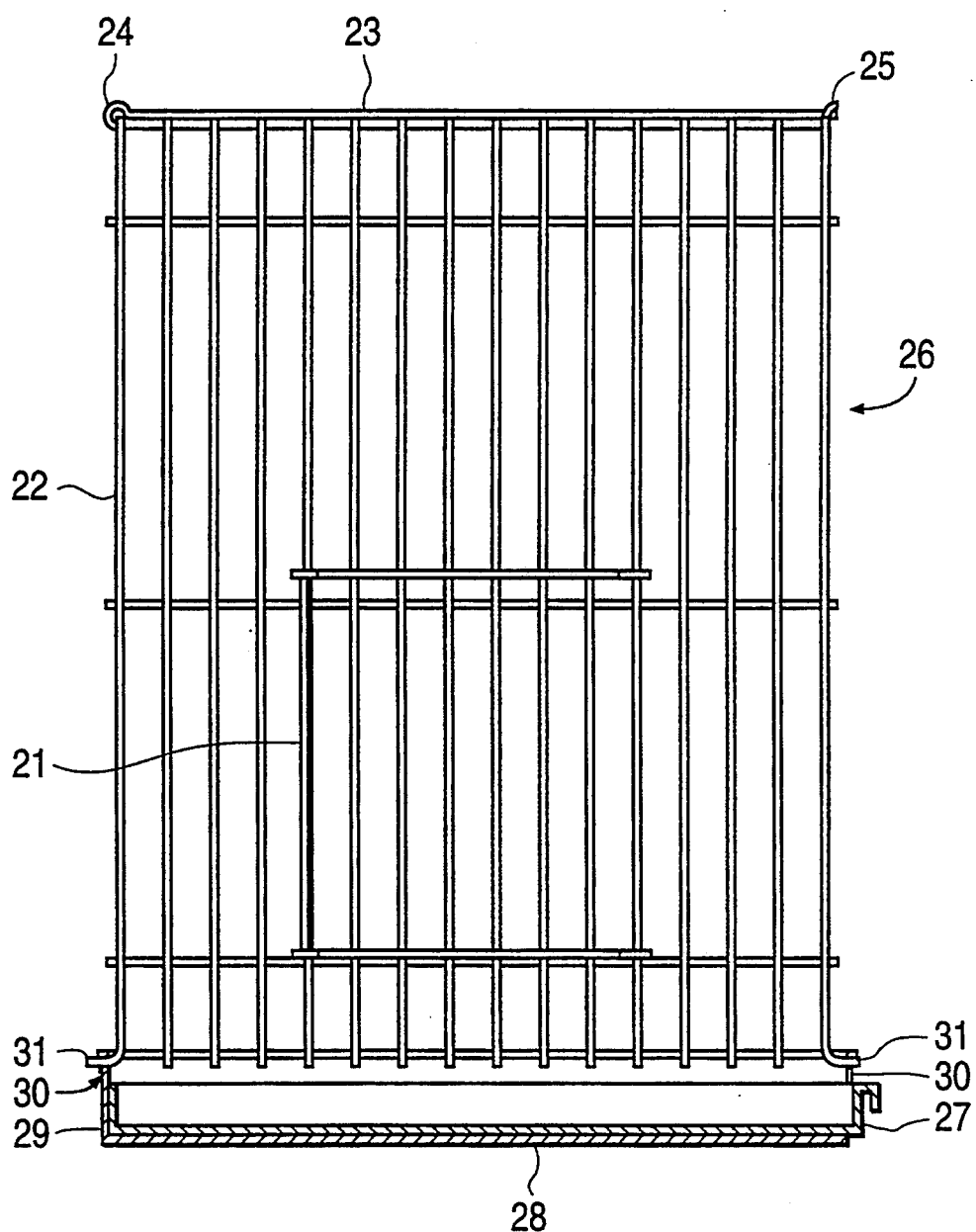
FIG. 5 is a front view showing a conventional net cage.

The vertical plate portion 3a is provided with two first engaging pieces 11 for engaging and holding the intermediate reinforcing wire material (c) on the upper side of the pieces 11 under the condition that the reinforcing wire material (a) is engaged with the groove 10 in a so-called nonextractably inserted condition, the pieces 11 being on the lower portion side of an inner surface of the portion 3d. See also the lower frame 5 shown in FIG. 1, constructed similarly. The descending plate portion 3c is provided with a second engaging piece 12 for stopping the reinforcing wire material (a) of an edge portion of the ceiling net portion 4 which is slidable in the horizontal direction. The piece 12 is provided on inner surface portions of two sides, standing face to face with each other, of a hexagon formed by the descending plate portion 3c, as shown in FIG. 4.

On the other hand, the receiving seat 8 is made of, for example, synthetic resins, and provided with a saucer 8b connected with an upper edge portion of a circumferential wall 8a of the hexagon shape thereof. The saucer 8b is adapted to stably receive the lower frame 5 thereon. See FIG. 2.

In addition, although the next cage body 7 is constructed in a hexagonal shape as seen in a plan view in the above described preferred embodiment, it may be constructed in optional shapes, for example, a four-cornered shape, an eight-cornered shape, a T letter shape and a square figure 8 shape, formed by partially overlapping corner portions of two four-cornered shapes, as seen in a plan view. Moreover, although the surrounding net portion 2 is divided into two parts, that is, the right part and the left part, in the above described preferred embodiment, it may be divided into three or more parts.

As described above, according to the present invention, the net cage body, of which the inside is empty, is constructed by a simple technique comprising engagement of the divided net portions with the upper and lower frames and slidable engagement of the ceiling net portion and the bottom net portion with the upper and lower frames, and the net cage can be obtained by merely placing the next cage body on the receiving seat. Since the simple engaging mechanisms are adopted as the connecting structures of the respective portions, the manufacturing expense of the net cage can be remarkably reduced as compared with the conventional ones.

And, as to construction, the net cage body can be simply separated from the receiving seat without the possibility of surprising the small animals and spilling the food, water and the like, and the possibility that the small animals escape by merely lifting up the net cage body, so that the washing of the receiving seat as a whole, the disposal of the sheet laid on the receiving seat and the like can be easily conducted with little trouble.

What is claimed is:

1. A net cage, comprising:
    a surrounding net portion, Said surrounding net portion comprising at least two parts forming said surrounding net portion, said surrounding net portion having a gateway therein and a door for opening and closing said gateway, a first edge portion defining an upper opening of said surrounding portion, and a second edge portion defining a lower opening of said surrounding net portion;
    an upper horizontal frame member removably connected to said surrounding net portion, said upper frame member having at least one first engaging piece thereon and at least one second engaging piece thereon, said at least one first engaging piece engaging said first edge portion of said surrounding net portion;
    a ceiling net portion removably connected to said upper frame member by said at least one second engaging piece on said upper frame member so as to close said upper opening of said surrounding net portion;
    a lower horizontal frame member removably connected to said surrounding net portion, said lower frame member having at least one third engaging piece thereon and at least one fourth engaging piece thereon, said at least one third engaging piece engaging said second edge portion of said surrounding net portion;
    a bottom net portion removably connected to said lower frame member by said at least one fourth engaging piece on said lower frame member so as to close said lower opening of said surrounding net portion;
    wherein said surrounding, ceiling and bottom net portions, as connected together by said upper and lower frame members, define a closed net cage body; and
    a receiving seat receiving said net cage body thereon;
    wherein said upper frame member extends along the entire circumference of said first edge portion, and comprises a central opening, said at least one first engaging piece on a lower side thereof and said at least one second engaging piece on an upper side thereof;

wherein said surrounding net portion comprises horizontal wire material at said first edge portion, said at least one first engaging piece engaging said horizontal wire material; and wherein said upper frame further comprises a groove facing downwards, said at least one first engaging piece having an engaging surface facing upwards, and said upper frame member receiving said first edge portion between said groove and said at least one first engaging piece.

2. The net cage of claim 1, wherein said upper and lower frame members have the same shape.

3. The net cage of claim 1, wherein said net cage body has a hexagonal shape as seen in plan.

4. The net cage of claim 1, wherein said upper and lower frame members are made of synthetic resin material.

5. The net cage of claim 1, wherein said upper frame member comprises a plurality of said first engaging pieces.

6. The net cage of claim 1, wherein said upper frame member has a surface extending circumferentially inward and defining said central opening, said second engaging piece being located above and spaced from said surface, and said second engaging piece and said surface receiving said ceiling net portion therebetween.

7. The net cage of claim 6, wherein there are a plurality of said second engaging pieces.

8. A net cage, comprising:
a surrounding net portion, said surrounding net portion comprising at least two parts forming said surrounding net portion, said surrounding net portion having a gateway therein and a door for opening and closing said gateway, a first edge portion defining an upper opening of said surrounding portion, and a second edge portion defining a lower opening of said surrounding net portion;
an upper horizontal frame member removably connected to said surrounding net portion, said upper frame member having at least one first engaging piece thereon and at least one second engaging piece thereon, said at least one first engaging piece engaging said first edge portion of said surrounding net portion;
a ceiling net portion removably connected to said upper frame member by said at least one second engaging piece on said upper frame member so as to close said upper opening of said surrounding net portion;
a lower horizontal frame member removably connected to said surrounding net portion, said lower frame member having at least one third engaging piece thereon and at least one fourth engaging piece thereon, said at least one third engaging piece engaging said second edge portion of said surrounding net portion;
a bottom net portion removably connected to said lower frame member by said at least one fourth engaging piece on said lower frame member so as to close said lower opening of said surrounding net portion;
wherein said surrounding, ceiling and bottom net portions, as connected together by said upper and lower frame members, define a closed net cage body; and
a receiving seat receiving said net cage body thereon;
wherein said upper frame member extends along the entire circumference of said first edge portion, defines a central opening, has said at least one first engaging piece on a lower side thereof and said at least one second engaging piece on an upper side thereof;

wherein said lower frame member extends along the entire circumference of said second edge portion, defines a central opening, has said at least one third engaging piece on an upper side thereof and said at least one fourth engaging piece on a lower side thereof;

wherein said surrounding net portion comprises horizontal wire material at said second edge portion, said at least one third engaging piece engaging said horizontal wire material; and wherein said lower frame further comprises a groove facing upwards, said at least one third engaging piece having an engaging surface facing downwards, and said lower frame member receiving said second edge portion between said groove and said at least one third engaging piece.

9. The net cage of claim 8, wherein said lower frame member comprises a plurality of said third engaging pieces.

10. A net cage, comprising:
a surrounding net portion, said surrounding net portion comprising at least two parts forming said surrounding net portion, said surrounding net portion having a gateway therein and a door for opening and closing said gateway, a first edge portion defining an upper opening of said surrounding portion, and a second edge portion defining a lower opening of said surrounding net portion;
an upper horizontal frame member removably connected to said surrounding net portion, said upper frame member having at least one first engaging piece thereon and at least one second engaging piece thereon, said at least one first engaging piece engaging said first edge portion of said surrounding net portion;
a ceiling net portion removably connected to said upper frame member by said at least one second engaging piece on said upper frame member so as to close said upper opening of said surrounding net portion;
a lower horizontal frame member removably connected to said surrounding net portion, said lower frame member having at least one third engaging piece thereon and at least one fourth engaging piece thereon, said at least one third engaging piece engaging said second edge portion of said surrounding net portion;
a bottom net portion removably connected to said lower frame member by said at least one fourth engaging piece on said lower frame member so as to close said lower opening of said surrounding net portion;
wherein said surrounding, ceiling and bottom net portions, as connected together by said upper and lower frame members, define a closed net cage body; and
a receiving seat receiving said net cage body thereon;
wherein said lower frame member extends along the entire circumference of said second edge portion, defines a central opening, has said at least one third engaging piece on an upper side thereof and said at least one fourth engaging piece on a lower side thereof;

wherein said surrounding net portion comprises horizontal wire material at said second edge portion, said at least one third engaging piece engaging said horizontal wire material; and wherein said lower frame further comprises a groove facing upwards, said at least one third engaging piece having an engaging surface facing downwards, and said lower frame member receiving said second edge portion between said groove and said at least one third engaging piece.

11. The net cage of claim 10, wherein said lower frame member comprises a plurality of said third engaging pieces.

12. The net cage of claim 10, wherein said lower frame member has a surface extending circumferentially inward and defining said central opening, said fourth engaging piece being located below and spaced from said surface, and said fourth engaging piece and said surface receiving said bottom net portion therebetween.

13. The net cage of claim 12, wherein there are a plurality of said fourth engaging pieces.

* * * * *